March 29, 1949. G. B. ENGELHARDT 2,465,437
HIGH-G CENTRIFUGE
Filed Nov. 30, 1945 2 Sheets-Sheet 1

Inventor
George B. Engelhardt
By J. H. Church & W. E. Thibodeau
Attorneys

March 29, 1949.　　　G. B. ENGELHARDT　　　2,465,437
HIGH-G CENTRIFUGE
Filed Nov. 30, 1945　　　2 Sheets-Sheet 2
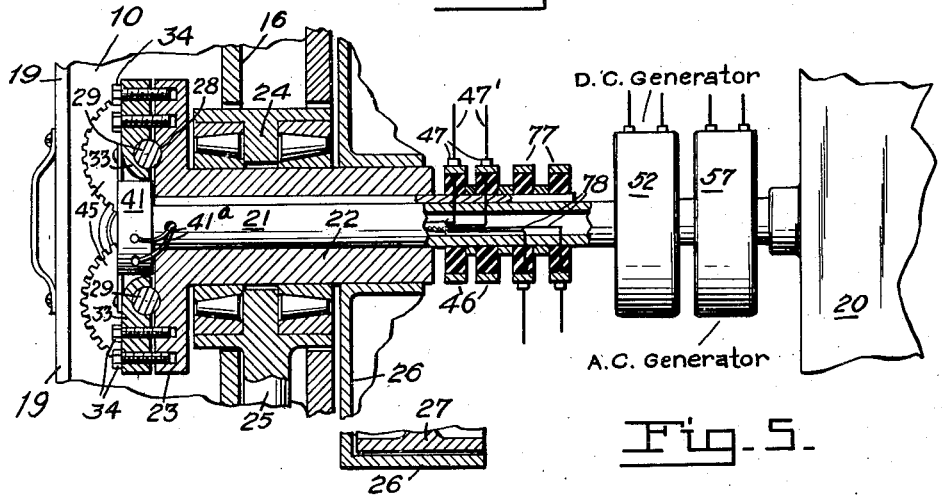
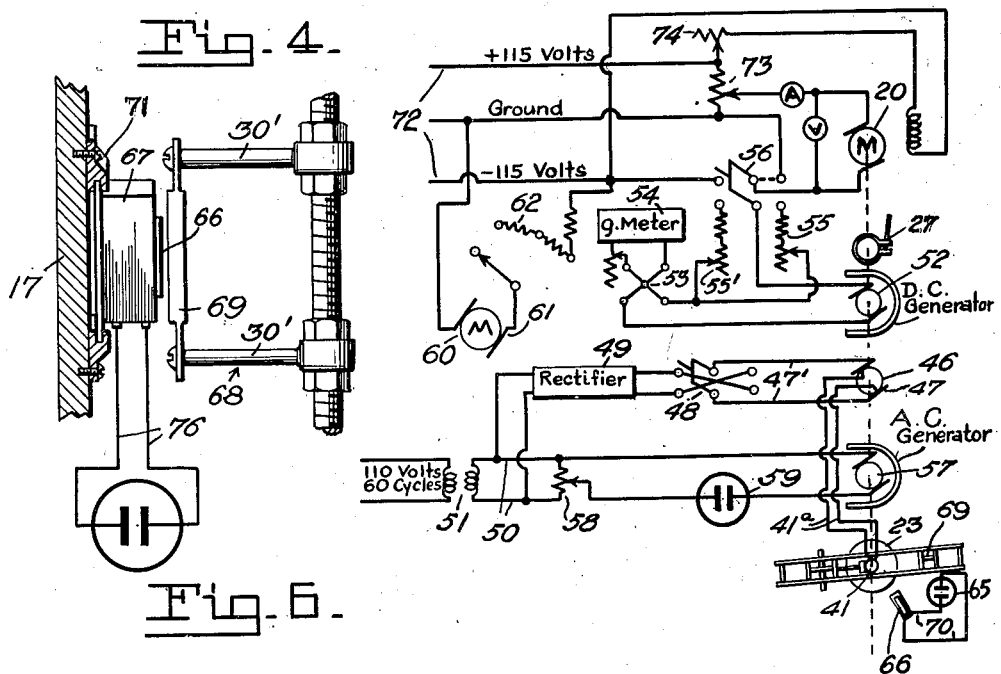
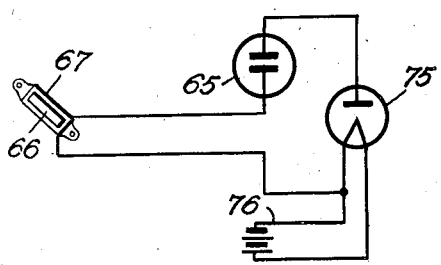
Inventor
George B. Englehardt
By J. H. Church & H. E. Thibodeau
Attorney Patented Mar. 29, 1949

2,465,437

UNITED STATES PATENT OFFICE 2,465,437

HIGH-G CENTRIFUGE

George B. Engelhardt, New York, N. Y., assignor, by mesne assignments, to the United States of America as represented by the Secretary of War Application November 30, 1945, Serial No. 632,067

5 Claims. (Cl. 73—167)

The invention relates to improvements in centrifuges, particularly to ultra high g centrifuges and a method of simulating acceleration forces such as involved in ordnance projectiles when fired.

It is also an object to improve the construction and functions of high speed centrifuges in novel ways contributing to an important extent to facilitating the use of such devices for conventional purposes as well as for special purposes, and enabling higher accelerations than heretofore practicable.

It is an important object to enable the counterbalancing of test objects or specimens with nicety so as to eliminate vibration which might result from differences in weight of specimen and counterweight, or differences in radius of test specimens and counter weight. A most impelling attainment in view leading to the invention in one aspect, is to enable such accurate counterbalancing to be effected and adjusted at will during the operation of the centrifuge.

It is also a desideratum to enable constant optical observation of an object or specimen throughout the test thereof in the device embodying the apparatus of the invention, instead of requiring stoppage for adjustment. This is highly valuable in observation of deformations of resilient specimens or initiation of functions of mechanical devices under acceleration, as well as in observations of separations of fluids, fluids and solids, or occlusions, etc. It is a specific purpose to present a novel means for enabling such observations, and particularly a novel stroboscopic system.

A further impelling motive for the invention is to enable the making of certain and various measurements while the specimen is under test in a novel way.

Another novel attainment of the invention resides in the manner of enabling direct readings at every moment, of acceleration to which an article is being subjected, in terms which may be transferred to equations, or which are those customarily used in specifications of requirements, or tolerances for various manifestations in specimens, samples, etc. It is a related aim to enable the verification of the accuracy of readings relating to speed and acceleration at any instant in the operation of the apparatus by simple optical observation.

A highly important aim of the invention is to present a method whereby devices required to function in a projectile at a given acceleration may be tested and demonstrated by similar force, while being constantly observed and their responses made clearly apparent to the observer.

It is an animating motive to provide a high factor of safety for such a high g centrifuge in a simple and economical manner, effective in case of breakage while operating, and to also control the manner of failure in a novel way.

Additional objects, advantages and features of invention reside in the construction, arrangement and combination of parts in the apparatus, and the steps of procedure involved in the embodiment and practice of the invention as will be set forth, apparent, or understood in or from the following description and accompanying drawings wherein:

Figure 2 is a fragmentary vertical section in a plane with the main shaft, partly diagrammatic;

Figure 4 is a detail elevation of a possible mounting of the stroboscopic magnet and armature bar;

Figure 5 is a schematic diagram of the centrifuge system, with electrical circuits;

Figure 6 is a diagram of a possible modified circuit for the stroboscopic device.

Figure 3:
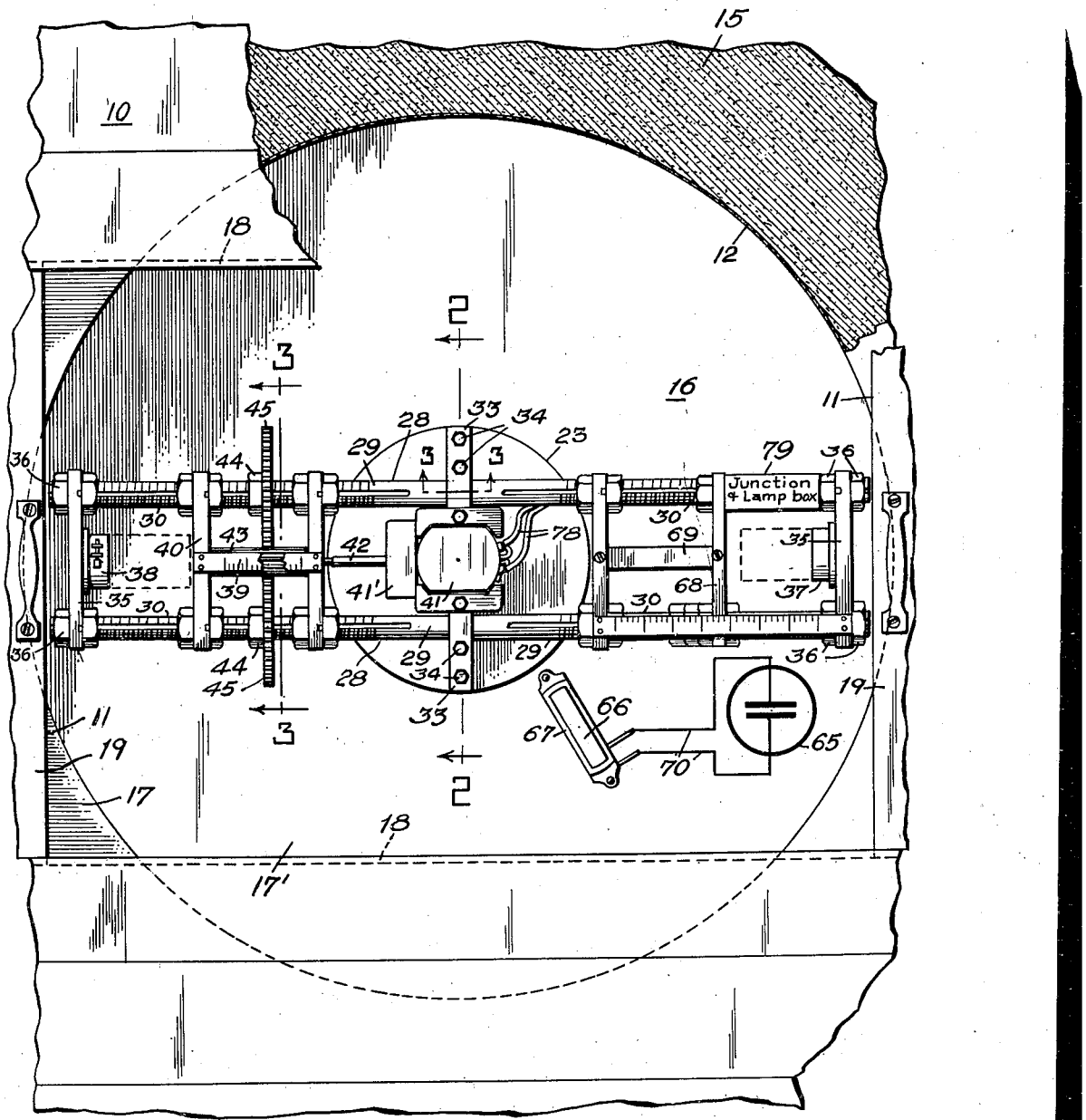
Figure 3 is a fragmentary section of the tension rods.
Figure 1:
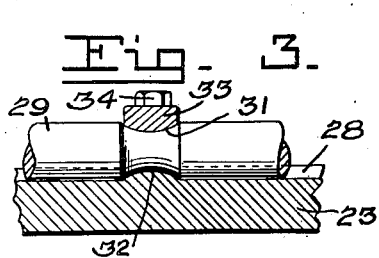
Figure 1 is a front elevation of an example of apparatus constructed in accordance with the invention partly in section and with parts broken away, a diagram of a stroboscopic device being imposed thereon.

Referring more particularly to the drawings, there is illustrated a casing 10 of generally cylindrical form, having small extent in the direction of its axis. It may be closed at back and front with access openings and closures as at 11 in Figure 1 for the front, and otherwise arranged but not shown at the back. The main circular bounding part 12 of the case is a double wall structure of ply wood or thin sheet metal. Principal dependence for safety is placed in a filling of packed sand 15 between the two walls named, this body of sand having a radial extent of eighteen inches in one embodiment. The annular enclosure may measure about forty-eight inches in inside diameter and the radius of the arms of the centrifuge to be described has been in the neighborhood of twenty inches. The fore and aft measurement of the case in that part which encloses the rotating arms of the centrifuge may be fifteen inches or more or less, determined by a rear wall plate 16 and a front wall 17, the latter having a horizontal opening 17' coincident with the diameter of the case. On this a rectangular frame is mounted including horizontal guides 18 in which heavily glazed doors 19 are slidable, affording ample access to parts of the apparatus for the uses intended, and permitting ready observation of articles under test.

The apparatus may include a main driving motor 20 which may be conventionally mounted rearwardly of the rear plate 16, with its shaft 21 as the main shaft of the apparatus extended through a small opening in this plate. The motor shaft 21 is considerably elongated, so as to accommodate the hub of the centrifuge, two or more small generators and slip rings, all to be described.

In the present instance the centrifuge comprises a rotor having a hub body 22 of substantial length keyed to the shaft 21 and including a heavy integral planiform head plate 23 at its outer end within the case 10. The hub is supported in a conventional bearing 24 on a bracket 25 at the rear of the casing, and also carries a brake drum 26 rearwardly of the case 10 with which there is cooperatively associated a conventional brake 27 of any suitable construction. This mounting of the hub relieves the shaft 21 of vibration strains and the shaft is also saved from braking torque by mounting the drum on the hub, as will be understood.

The flange 23 is formed or provided with identical seats 28 spaced at opposite sides of the axis of the axis of the hub arranged and shaped to receive parallel rods 29, the paired mutually adjacent ends of which constitute respective arms 30 of the centrifuge. At their middles the rods are slightly reduced in cross section by respective encircling notches 31 and on the hub two small radial ribs 32 are formed on a diametrical line at right angles to the seats, one in each seat 28, fitted to a respective notch 31 of the adjacent rod. A clamp 33 is fitted over each rod, engaged in the notch 31 and secured by bolts 34 engaged through shanks of the clamps and in the flange 23. By this means the rods are held securely in a permanent relation to the hub; and—which is a most important feature of safety—by proportioning the rods and notches so that the minimum cross section is designed to sustain the maximum stresses which are safe, involved by the maximum speed of rotation for which the machine is designed, with a proper tolerance margin, in case of accident, or run-away, if the arms begin to fail by longitudinal stresses beyond the elastic limit of the reduced cross section of either rod, it will quickly break at the reduced part and its load applied to the other, breaking that also, so that the whole arm is released. One arm being so freed, the reduced parts of the rods of the other arm will permit it also to draw away from the clamps, relieving the centrifuge hub of its load. Damage is thus minimized as to motor and shaft and other parts on the shaft; and failing of parts which are not immediately severed is avoided.

The rods 29 have in one embodiment consisted of one inch diameter cold rolled steel, they are for convenience all-thread stock with right-hand threads on one and left-hand threads on the other although other expedients may be adopted if preferred. At the extremity of each arm a cross plate 35 is mounted, receiving both rods therethrough and secured by nuts 36 on each rod at opposite sides of the plate. On the inner side of one plate there is provided a receptable and specimen retainer 37, while a counterweight holding device 38 is provided on the opposite plate 35.

An H-shaped frame 40 has its parallel end members mounted on the rods intermediately of the length of one arm 30, in the present instance that arm which carries the counterweight mounting, the middle bar 39 of this frame thus extending longitudinally of the arm midway between the rods 29. The end members of the H-frame are engaged on the rods in the same manner as the plates 35 and held rigidly in place by similar nuts.

Concentric with the axis of the hub a small reversible motor 41 is mounted on the hub, driving a radial shaft 42 mounted in conventional bearings on the hub and on the H-frame. The motor 41 may be of a slow speed type or a reduction gearing 41' may be used between it and the shaft 42. At its outer end the shaft has fixed thereon a gear 43 of a length along its axis nearly equal to that of the frame 35. On each rod within the length of the frame 40 there is a balancing nut 44 having fixed thereon concentric with the rod a gear 45 of sufficient radius to mesh with the gear 43. The two gears 45 and nuts 44 are in the same plane normal to the rods, so that when the gear 43 rotates the nuts will be operated thereby to move axially in the same direction, longitudinally of the arm 30. The motor 41 heretofore used has been a 6-volt D. C. motor, its leads 41a being extended through a hollow outer portion of the main shaft 21 to slip rings 46 carried by the shaft 21 with which there are engaged stationary brushes 47 in a control circuit 47' exteriorly of the case 10. This circuit includes a manual normally open reversing switch 48 in the output circuit of a rectifier 49 connected in parallel across the 6-volt A. C. line 50 from the secondary of a step down transformer 51.

A small D. C. magnet generator 52 is mounted on the main shaft back of the case 10, which is utilized to obtain throughout operation of the centrifuge a direct reading of the acceleration to which the test object is subjected. This is achieved by connecting the armature leads to a thermocouple 53 and meter 54 as in Figure 5. The output current of this type of generator is directly proportional to the speed of the drive shaft, but the reading of a meter associated with a thermocouple is proportional to the square of this current, and thus in this use to the square of the speed. Since the acceleration is also proportional to the square of the speed, the thermocouple meter can be calibrated with a linear scale in terms of the acceleration to which the test object is subjected. The actual calibration has been in terms of g, the gravitational constant, and the meter in this instance becomes a "g meter."

For correction of the readings rendered by the "g meter" duplicate variable resistances 55, 55' are alternatively included in the g meter circuit by means of and at respective closed positions of one side of a double throw switch 56. The other blade of this switch operates as a single pole double throw switch in shifting from 115 volt potential to 220 volt potential in the line to the main driving motor 20 for starting or the reverse in stopping the machine, as will be explained. In addition a conventionally used variable resistance 55 forms a part of the meter 54.

For checking the accuracy of the readings thus obtained a small 2-pole 60-cycle, A. C. generator 57 has its armature mounted on the main shaft and its output coupled across the secondary output of the transformer 51 through a potentiometer 58, a neon discharge tube lamp 59 being coupled in series in the output of this generator. The potentiometer may be used to provide a voltage component at the tube 59 not sufficient to produce a normal illuminating discharge, and operation of the generator may be used to supply to the tube a voltage component which is also below the required potential, but when the alternations of the generator 57 coincide with those of the induced currents from the transformer 51 the lamp will light to a desired brilliance. But when the alternations thereof are in 180 degree relation to those of the transformer output, the lamp will be extinguished. Similar coincidences in either case—and corresponding lamp functions—will occur as the speed of the generator equals multiples of sixty and by noting these and the reading of the "g meter" a close approximation of correct readings may be obtained by adjustments at 55 when indicated. Other utilizations of the two sources 51 and 57 may be carried out for similar or other purposes.

For stopping such a centrifuge operating at times at 1000 g, it is desirable to use a braking means, which may include a motor 60 having its armature mounted on or geared to the shaft of motor 20. The motor 60 may be connected across the 115 volt service line through a switch 61 and rheostat 62 suitably to decelerate the centrifuge. Alternatively or together therewith a mechanical brake 27 may be used, of any conventional form, the drum 28 of which may be fixed on the hub 22 of the centrifuge, so that braking stress and torque of momentum of the centrifuge is removed from the shaft of the driving motor 20. The details of the brake are not shown except schematically as in Figure 5, and fragmentarily in Figure 2.

To enable observation of test objects throughout the course of the test an automatic stroboscopic device is provided comprising a gaseous discharge tube 65 (Figures 1 and 6), mounted on the case 10 or on the rotor as hereinafter indicated. This tube may be one of the neon or other commercial types now available.

A permanent magnet 66 is provided, consisting of a core magnet a winding 67 therearound and for example shown fixed on the back wall of the case in Figure 4, and on the arm 30 of the centrifuge rotor between the axis of rotation of the device and the specimen holder—there is a frame 68 similar to the H-frame 40, and similarly mounted and secured on the rods 29.

Its middle member 69 is a radial iron bar mounted so that in rotation of the centrifuge it will move in close relation to the magnet 66, and produce a fluctuation of the normally static magnetic field therearound, thus producing momentarily an alternating current in the winding and circuit 70 leading therefrom to the lamp 65. The magnet bar 66 is narrowed in cross section on one transverse axis and its major transverse axis is in radial relation to the axis of the centrifuge. If desired the extremity of the bar magnet may be brought to a radial knife edge and the bar 69 similarly shaped on the side next the magnet so that the alternation in the magnet flux will occur in an extremely short time. If desired a conventional means may be employed in the circuit 70 so as to utilize the flow in one direction only incident to the alternation produced on each passage of the bar 69, so that the lamp 65 will be illuminated only once. Electronic circuits suitable for the purpose are common and well known. One example is formally illustrated in Figure 6, where a diode 75 is shown in circuit with lamp 65.

As there will be angular differences of position of the specimen holder 37 with respect to the magnet when the lamp is energized at different speeds, due to counter E. M. F. in the winding and magnetic reluctance, in order to regulate flux movements and resultant current flow in relation to the position of the specimen and to more certainly time the illumination while the holder 37 is in a convenient position for observation, the magnet and winding may be mounted as a unit adjustable along a track segment 71 on the back plate 16, concentric with the axis of the rotor, to permit adjustment of the magnet so that the lamp may be energized while the specimen holder is in the desired position.

In the operation of the machine, it may be started by throwing the switch 56 (Figure 5) to the right, connecting the driving motor 20 across the 115 volt circuit at one side of the three wire D. C. power supply 72 and a potentiometer 73 used to develop torque gradually in the motor. A field circuit rheostat 74 may also be conventionally used to control speed in part for fine adjustments of speed. When the potentiometer has been moved from zero potential position to its 115 volt position the motor will operate at about half its possible speed. For further acceleration the switch 56 is opened, the potentiometer brought quickly to its zero position and the switch 56 moved to its alternate position at the left in Figure 5. This connects the motor across the 230 volt service with the potentiometer in series with the motor. This potentiometer functioning now as a simple rheostat, by again moving the arm of the potentiometer to high position, the motor is brought to full speed.

The functioning of the g meter, balancing motor, and synchronizing lamp 59, will be understood from the preceding description of their use and functions, and effects of the centrifuge on specimens are apart from the invention.

In stopping the rotor, a reversal of the starting steps is first carried out which effects dynamic braking in the motor 20 and the brake 60 or 27, or both may be operated as before described. As before indicated, the brake motor 60 may be omitted and only a mechanical brake utilized in conjunction with dynamic braking manifest in motor 20.

In case either rod 29 is subjected to radial or other stress beyond its elastic limit while in operation, it will become severed by localized failure at the part 31. This frees both ends of the broken rod and at once adds their mass and that of parts of the other elements of the rotor to the load sustained by the remaining rod, causing the latter to fail before material flailing of partly severed parts occurs and the machine saved from racking damage by extreme unbalanced centrifugal forces. The freed parts will penetrate the inner circular wall plate of the case and will become embedded in and held by the mass of packed sand 15 without other extensive damage.

The driving motor may be a 2 horse power conventionally wound compound type having a normal full-load operating speed of at least 1400 revolutions per minute. The latter speed produces 1000 g at 18 inch radius, which is the approximate radius of the path of a sample in the machine. The proportions named give a factor of safety of approximately 3 to 1 for a one pound sample. Special alloy steel in the rods would greatly magnify the safe load and margin of safety.

The magnet and lamp may be mounted either on the case or other stationary part as described, or the lamp may be mounted on the arm 30' adjacent the specimen and the circuit extended thereto conventionally. Thus one or more sets of slip rings 77 may be provided from which leads 78 are extended through the shaft 21 and to a junction box and lamp mount 79 on the arm 30' beside the specimen holder 37. This may be used as part of the circuit 70, or may be used alternatively or simultaneously to effect connections with a specimen by which electrical impulses, current, or potential may be communicated to or from the specimen and apparatus outside the case 10.

The magnet and its winding and the armature bar may be transposed if desired to simplify the lamp circuit avoiding need of the slip rings in the circuit. The execution of this expedient is within the skill of the worker in this art and therefore is not illustrated. Alternatively also the magnet if stationary may be without winding, and instead the winding placed around the armature bar 69 in the circuit 70, so that flux drawn by the bar will cut the winding.

While I have disclosed with particularity a specific construction of one embodiment of the invention, it will nevertheless be understood that this is purely exemplary, and that various changes in the construction, substitution of materials and equivalents mechanical or otherwise may be made without departing from the spirit of the invention set forth in the appended claims, wherein:

I claim:

1. A centrifuge comprising a rotor hub, a rotor frame thereon comprising parallel rods in the plane of rotation of the rotor each of said rods being reduced in cross section at their middles, mounting means on the hub fitting into said reduced parts, a sample mount at one end of said frame, and counterbalancing means on the opposite end of the frame.

2. A rotor device comprising an axial hub, a rotor rod releasably fixed thereon having opposite end portions extended radially, said rod being reduced in cross section at its mid part at the hub mounting means on the hub fitting into the reduced parts of the rod to hold the rod against sliding movement therein, said reduced part being adapted to fail within the mounting means under excess stress, whereby the two ends of the rod are freed for outward movement from the mounting means.

3. In a centrifuge a rotor, a threaded shaft attached intermediate its ends to said rotors, an interiorly threaded member engaged on one end of the shaft, a test sample holder on the opposite end of said shaft, a reversible motor axially located on the rotor, operative connections between the motor and interiorly threaded member to rotate the same on said shaft, and a normally open operating circuit for said motor including a reversing switch.

4. In a centrifuge, two relatively rotatable members, one of which is a stationary case having a view opening, and the other a rotor revoluble therein, generator elements comprising a permanent magnet fixed on one and an armature bar fixed on the other of said members so that one will move close past the other in operation of the rotor, an inductive winding around one of the last named two generator elements, a test sample holder on the rotor, an electric lamp located to illuminate the sample holder in at least one position in its rotation with the rotor, and a circuit connecting the lamp and said winding, said lamp and circuit being constructed to produce stroboscopic illumination of a sample carried by the sample holder in response to current induced in said winding by relative passage of said magnet and armature bar.

5. In a centrifuge, a rotor, a measuring instrument comprising a direct current generator, synchronized with the rotor, a thermocouple in the output circuit thereof and a potential meter in response relation to the output of the thermocouple calibrated in units of g.

GEORGE B. ENGELHARDT.

REFERENCES CITED

The following references are of record in the file of this patent:

UNITED STATES PATENTS

| Number | Name | Date |
|---|---|---|
| 1,608,817 | Russell et al. | Nov. 30, 1926 |
| 1,711,101 | Shanck | Apr. 30, 1929 |
| 1,849,831 | Hewlett | Mar. 15, 1932 |
| 1,854,949 | Mead | Apr. 19, 1932 |
| 2,396,678 | Bucky | Mar. 19, 1946 |